United States Patent
Lee et al.

(10) Patent No.: US 10,963,011 B2
(45) Date of Patent: Mar. 30, 2021

(54) TOUCH INPUT METHOD AND MOBILE TERMINAL

(71) Applicant: Samsung Electronics Co., Ltd., Suwon-si (KR)

(72) Inventors: Yohan Lee, Seoul (KR); Jaehyeon Kang, Suwon-si (KR); Dasom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 14/090,258

(22) Filed: Nov. 26, 2013

(65) Prior Publication Data
US 2014/0145989 A1 May 29, 2014

(30) Foreign Application Priority Data

Nov. 26, 2012 (KR) .................. 10-2012-0134435

(51) Int. Cl.
*G06F 1/16* (2006.01)
*G06F 3/0488* (2013.01)
(Continued)

(52) U.S. Cl.
CPC .......... *G06F 1/1637* (2013.01); *G06F 1/1626* (2013.01); *G06F 1/1643* (2013.01);
(Continued)

(58) Field of Classification Search
CPC .... G06F 1/1637; G06F 1/1692; G06F 1/1626; G06F 1/1643; G06F 1/3287;
(Continued)

(56) References Cited

U.S. PATENT DOCUMENTS

2006/0197750 A1  9/2006  Kerr et al.
2007/0291015 A1  12/2007  Mori
(Continued)

FOREIGN PATENT DOCUMENTS

CN  102362254 A  2/2012
EP  2 159 676 A1  3/2010
(Continued)

OTHER PUBLICATIONS

Hak5, "Hak5—CES 2011—Double sided LCD keyboards?!", XP054976268, Jan. 7, 2011.
(Continued)

*Primary Examiner* — William Boddie
*Assistant Examiner* — Saifeldin E Elnafia
(74) *Attorney, Agent, or Firm* — Jefferson IP Law, LLP

(57) ABSTRACT

A touch input method and a mobile terminal are provided. The mobile terminal includes a touch screen having a transparent display panel, a front touch panel configured to detect a touch input corresponding to the front of the transparent display panel, and a rear touch panel configured to detect a touch input corresponding to a rear of the transparent touch panel. The touch input method includes detecting a touch input from one of the front touch panel and the rear touch panel, determining whether a user's intent is a data input via the rear touch panel in response to the touch input, and displaying a keypad on a top of the touch screen if the user's intent is determined as data input via the rear touch panel.

22 Claims, 7 Drawing Sheets

(51) Int. Cl.
  *G06F 1/3287* (2019.01)
  *G06F 1/3234* (2019.01)
(52) U.S. Cl.
  CPC .......... *G06F 1/1692* (2013.01); *G06F 1/3262* (2013.01); *G06F 1/3287* (2013.01); *G06F 3/04883* (2013.01); *G06F 3/04886* (2013.01); *G06F 2203/0382* (2013.01); *G09G 2330/021* (2013.01); *Y02D 10/00* (2018.01)
(58) Field of Classification Search
  CPC .......... G06F 3/0488; G06F 2203/0382; G06F 1/3262; G06F 3/04886; G06F 3/04883; G09G 2330/021; Y02D 10/00
  USPC .................................................. 345/173–175
  See application file for complete search history.

(56) References Cited

U.S. PATENT DOCUMENTS

| | | | |
|---|---|---|---|
| 2010/0045621 A1 | 2/2010 | Kang et al. | |
| 2010/0056220 A1 | 3/2010 | Oh et al. | |
| 2010/0241985 A1* | 9/2010 | Kim | G06F 3/04886 715/773 |
| 2011/0009169 A1* | 1/2011 | Kim | G06F 1/1624 455/566 |
| 2011/0021251 A1 | 1/2011 | Linden | |
| 2011/0157055 A1 | 6/2011 | Tilley et al. | |
| 2012/0068936 A1 | 3/2012 | Kim | |
| 2012/0242594 A1 | 9/2012 | Matsumoto | |
| 2013/0234948 A1* | 9/2013 | Jian | 345/173 |
| 2014/0045553 A1* | 2/2014 | Shimada | 455/566 |

FOREIGN PATENT DOCUMENTS

| | | | |
|---|---|---|---|
| EP | 2163972 A2 | 3/2010 | |
| JP | 2007-334827 A | 12/2007 | |
| JP | 2012-185691 A | 9/2012 | |
| JP | 2012-521034 A | 9/2012 | |
| JP | 2012-212409 A | 11/2012 | |
| JP | 2012-230519 | * 11/2012 | .......... H04M 1/0266 |
| KR | 10-2010-0027866 A | 3/2010 | |
| KR | 10-2010-0106195 A | 10/2010 | |
| KR | 10-2010-0133259 A | 12/2010 | |
| WO | 2012-147522 A1 | 11/2012 | |

OTHER PUBLICATIONS

Ehowtech, "Accessing an iPad Virtual Keyboard: iPad Tips", XP054976270, Jun. 8, 2012.
Korean Office Action dated Jan. 21, 2019 issued in Korean Patent Application No. 10-2012-0134435.

* cited by examiner

TOUCH INPUT METHOD AND MOBILE TERMINAL

CROSS-REFERENCE TO RELATED APPLICATION(S)

This application claims the benefit under 35 U.S.C. § 119(a) of a Korean patent application filed on Nov. 26, 2012 in the Korean Intellectual Property Office and assigned Serial No. 10-2012-0134435, the entire disclosure of which is hereby incorporated by reference.

TECHNICAL FIELD

The present disclosure relates to a touch input method and a mobile terminal. More particularly, the present disclosure relates to a touch input method in a mobile terminal having a touch screen in which a transparent display panel, a front touch panel detecting a touch input of the front thereof, and a rear touch panel detecting a touch input of the rear of the transparent display panel are included.

BACKGROUND

A mobile terminal, such as a smart phone or a tablet PC, is generally equipped with a touch screen and performs various functions of the mobile terminal in response to a touch input of a user on the touch screen. The touch screen of the mobile terminal displays various keypads such as an English QWERTY, an English 3*4, a Korean 3*4, a special key, and the like. When a user touches the keypad with a hand or a pen, the touch screen delivers a touch event to a controller of the portable terminal in response to the touch. The touch event includes a touch coordinate. The controller detects the touch coordinate from the touch screen, verifies a key value which is preset in the touch coordinate in a key value table, and performs a function (for example, displays "A") corresponding to the verified key value.

The mobile terminal industry has conducted active research to put a mobile terminal having a transparent display panel to practical use. The transparent display panel is a display panel which permits the user to look at another side (for example, a rear) through one side (for example, a front) of the transparent display panel. In other words, an object positioned in the rear is projected to the front. For example, the user looks at the user's own hand which is projected to the transparent display panel with an image displayed on the transparent display panel. Likewise, the transparent display panel is characterized that the rear is visible.

The technology to implement this feature is very diverse. With a recent technology development of an Active Matrix Organic Light Emitting Diode (AMOLED), the transparent display panel is likely to be popularized. In the automotive industry, the transparent display panel is already at the stage of a practical use as the configuration of an instrument panel.

The mobile terminal may have the touch screen in which the transparent display panel, the front touch panel detecting the touch input corresponding to the front of the transparent display panel, and the rear touch panel detecting the touch input corresponding to the rear of the transparent display panel are included. Accordingly, the user may perform the touch input through the rear as well as the front of the touch screen. While holding the mobile terminal, the user may touch the front with a thumb of the corresponding hand and may touch the rear with an index finger and a middle finger of the corresponding hand. In other words, the user may perform the touch input with one hand through the front and the rear of the touch screen. However, due to instability, it is difficult to perform the touch input with one hand.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, as aspect of the present disclosure is to provide a touch input method and a mobile terminal which enables a touch input in stable with a mobile terminal grabbing hand through a front and a rear of a touch screen.

In accordance with an aspect of the present disclosure, a method of inputting a touch in a mobile terminal having a touch screen that includes a transparent display panel, a front touch panel configured to detect a touch input corresponding to a front of the transparent display panel, and a rear touch panel configured to detect a touch input corresponding to a rear of the transparent display panel are included includes detecting a touch input from one of the front touch panel and the rear touch panel, determining whether a user's intent is a data input via the rear touch panel in response to the touch input, and displaying a keypad on a top of the touch screen when the user's intent is determined as data input via the rear touch panel.

In accordance with another aspect of the present disclosure, a mobile terminal is provided. The mobile terminal includes a touch screen including a transparent display panel, a front touch panel configured to detect a touch input corresponding to a front of the transparent display panel, and a rear touch panel configured to detect a touch input corresponding to a rear of the transparent display panel, and a controller configured to control the transparent display panel to detect a touch input from one of the front touch panel and the rear touch panel, determines whether a user's intent is a data input via the rear touch panel in response to the touch input, and controls the touch screen to display a keypad on a top of the touch screen when the user's intent is determined as data input via the rear touch panel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a user performs a touch input with a hand that is holding a mobile terminal, a thumb of the corresponding hand touches a front of a touch screen, and an index finger or a middle finger touches a rear of a touch screen. The thumb is placed on a bottom of the touch screen (as shown in FIGS. 3A, 3B, 4, 5A, and 5B) relative to an index finger and a middle finger. A touch input method and the mobile terminal of the present disclosure have been conceived in this regard.

The mobile terminal of the present disclosure includes a touch screen having a transparent display panel, a front touch panel detecting the touch input corresponding to the front of the transparent display panel, and a rear touch panel detecting the touch input corresponding to the rear of the transparent display panel, and may be a portable electric device such as a smart phone, a tablet PC, a notebook PC, a digital camera, or the like.

Figure 1:
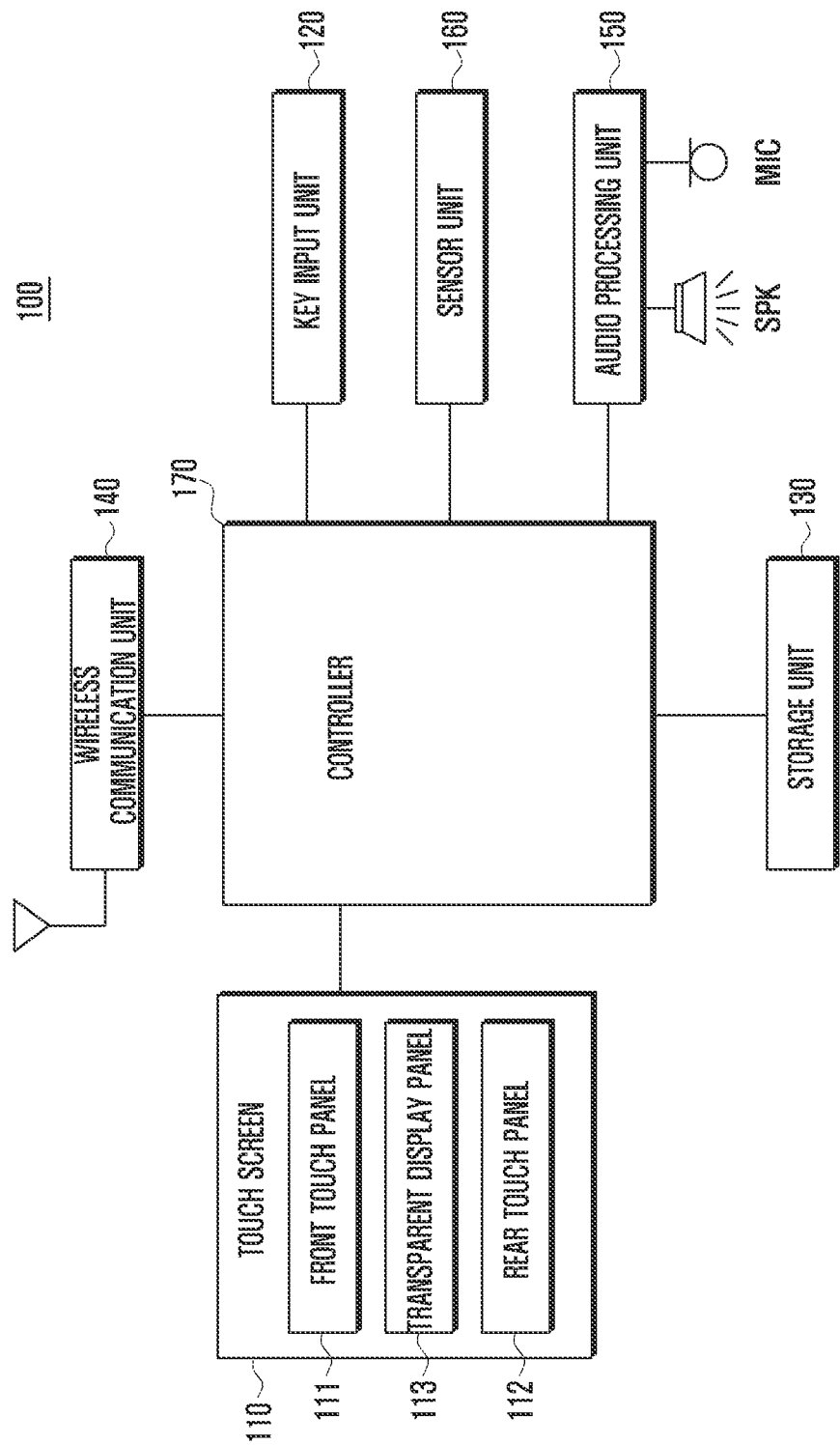
FIG. 1 is an electrical block diagram of a mobile terminal according to an embodiment of the present disclosure.

FIG. 1 is an electrical block diagram illustrating a mobile terminal according to an embodiment of the present disclosure.

Referring to FIG. 1, the mobile terminal 100 according to the present disclosure includes a touch screen 110, a key input unit 120, a storage unit 130, a wireless communication unit 140, an audio processing unit 150, a Speaker (SPK), a Microphone (MIC), a sensor unit 160, and a controller 170.

The touch screen 110 includes a front touch panel 111, a rear touch panel 112 and a transparent display panel 113. The front touch panel 111 and the rear touch panel 112 are placed on the transparent display panel 113. The front touch panel and the rear touch panel 112 may be implemented as an add-on type in which the front touch panel and the rear touch panel 112 are respectively placed on the front and the rear of the transparent display panel 113, or as an on-cell type or an in-cell type in which the front touch panel and the rear touch panel 112 are inserted into the transparent display panel 113.

The front touch panel 111 generates an analog signal (for example, a touch event) in response to a touch input corresponding to a front touch panel 111, and delivers an analog signal to a controller 170 via an Analog to Digital (A/D) conversion. The touch event includes a touch coordinate (x, y). When the touch coordinate is received from the front touch panel 111, the controller 170 determines that a touch tool (for example, a finger or a pen) is touching the front touch panel 111, and when the touch coordinate is not received from the front touch panel 111, the controller determines that the touch of the touch tool has been released. In addition, the controller 170 detects a movement of a touch from the front touch panel 111. The controller 170 determines that a touch has moved, for example, when the touch coordinate has converted from (x1, y1) into (x2, y2). The controller 170 calculates the position change amount (dx, dy) of the touch in response to the movement of the touch. The controller 170 detects the touch input from the front touch panel 111.

The touch input is a user gesture corresponding to the front touch panel 111, and may include a touch, a multi touch, a tap, a double tap, a long tap, a tap & touch, a drag, a flick, a press, a pinch in, and a pinch out. The touch refers to a gesture touching a touch tool to any one certain point of the front touch panel 111 of the screen by the user. The multi touch refers to a gesture touching a plurality of touch tools (for example, a thumb and an index finger) at various points. The tap refers to a gesture of a touch-off operation in which a certain point is touched and the touch input tool releases the touch from a corresponding point without a movement of the touch input tool. The double tap refers to a gesture of tapping twice on a certain point sequentially. The long tap refers to a gesture in which a touch is performed relatively longer than the tap and the touch input tool releases the touch at a corresponding point without a movement of the touch input tool. The tap & touch refers to a gesture re-touching the corresponding point within a predetermined time (for example, 0.5 second) after tapping a certain point of a screen. The drag refers to a gesture of moving the touch input tool in a predetermined direction in a state where a certain point is touched. The flick refers to a gesture releasing the touch after moving the touch input tool relatively faster than the drag. The press refers to a gesture of pressing a corresponding point after touching a certain point. The pinch in is a gesture narrowing an interval between the touch tools after multi touching two points at the same time by two touch tools, and the pinch out is a gesture broadening an interval between the touch tools.

The touch refers to a state of contacting to the front touch panel 111 and the other touch inputs refer to a touch change. The front touch panel 111 is equipped with a pressure sensor and may detect the pressure of the touched point. The detected pressure information is delivered to the controller 170, and the controller 170 distinguishes the touch and the press based on the detected pressure information.

The front touch panel 111 may be a complex touch panel configured to include a hand touch panel detecting a hand gesture and a pen touch panel detecting a pen gesture. The hand touch panel is configured as a capacitive type. Of course, the hand touch panel may be configured as a resistive type, an infrared type, or an ultrasonic wave type. In addition, the hand touch panel may not only generate a touch event by a hand gesture of the user but also may generate the touch event also by another object (for example, an object of a conductive material that can be applied to the capacitive change). The pen touch panel may be configured as an electromagnetic induction type. Accordingly, the pen touch panel may generate the touch event by a touch use stylus pen which is specially designed to form a magnetic field.

The function and a configuration of the rear touch panel 112 are also identical to the front touch panel 111.

The transparent display panel 113 displays an image under the control of the controller 170. The controller 170 stores the data in a buffer after rendering to an image. The transparent display panel 111 displays the image stored in the buffer after converting into an Analog signal. The transparent display panel 111 may display various images, for example, a lock screen, a home screen, an application execution screen, and a keypad according to a use of the mobile terminal 100. The lock screen is an image displaying on the transparent display panel 111 when the transparent display panel is turned on. When the touch input or the key input for releasing the lock is detected, the controller 170 may change the displaying image from the lock screen to the home screen or the application execution screen. The home screen may include a background image and a plurality of icons displaying on the background image.

The icons may correspond to various applications. When an icon is selected (by, for example, tapping an icon) by the user, the controller 170 executes the corresponding application (for example, a browser), and displays a corresponding execution screen on the transparent display panel 113. The transparent display panel 113 displays, under the control of the controller 170, one screen, for example, the application execution screen as the background among the screens, and displays another screen, for example, the keypad as a foreground. In addition, the transparent display panel 113 displays a first image on a first screen area, and displays a second image on a second screen area under the control of the controller 170. The transparent display panel 113 may be configured as a Liquid Crystal Display (LCD), an Organic Light Emitting Diode (OLED), an Active Matrix Organic Light Emitting Diode (AMOLED), or a Flexible display. Such displays are configured as a transparent type. Accordingly, the user may see the object located in the rear of the touch screen 110 through the front of the touch screen 110. Of course, the opposite case is also possible.

The key input unit 120 may include a plurality of keys in order to receive number or character information and set various functions. Such keys may include a menu loading key, a screen on/off key, a power on/off key, a volume control key and a shutter key. The key input unit 120 generates a key event related to the user setting and a function control of the mobile terminal 100 and delivers the key event to the controller 170. A key event may include a power on/off event, a volume control event, a screen on/off event, and a shutter event, etc. The controller 170 controls the elements by responding to such key events. A key of the key input unit 120 may be referred to as a hard key, and a virtual key displaying on the touch screen 110 may be referred to as a soft key.

The storage unit 130 is a secondary memory unit of the controller 170, and may include a disc, a Random Access Memory (RAM), a Read-Only Memory (ROM), a flash memory, and the like. The storage unit 130 store data which is generated from the mobile terminal 100 or is received from an external device (for example, a server, a desktop PC, and a tablet PC, etc.) through the wireless communication unit 140 or an external device interface (not shown).

The storage unit 130 stores a booting program, an Operating System (OS), and a touch screen controller. The touch screen controller is a program operating based on the operating system and controlling an operation of the touch screen. The touch screen controller of the present disclosure detects the touch input from the touch screen 110, determines the display position of the keypad in response to the touch input, and performs a function controlling the touch screen 110 to display the keypad on the determined position.

The storage unit 130 may include an embedded application and a 3rd party application. The embedded application refers to an application embedded to the mobile terminal 100. For example, the embedded application may be a browser, an email application, an instant message application, and the touch screen controller. The 3rd party application refers to an application that can be downloaded and installed to the mobile terminal 100 by an on-line market. Such 3rd party application may be freely installed and uninstalled.

When a power of the battery is supplied to the controller 170 of the mobile terminal 100, the booting program is loaded to a main memory device (for example, a RAM) of the controller 170. The booting program loads the operating system to the main memory device so that the mobile terminal 100 may be operated. The operating system loads the touch screen controllers to the main memory device. Such booting and the loading are well known, and thus, the detailed description thereof will be omitted.

The wireless communication unit 140 performs a voice call, a video call, or a data communication with an external device under the control of the controller 170. The wireless communication unit 140 includes a radio frequency transmission unit which performs up conversion and amplification of the frequency of the transmitting signal, and a radio frequency receiving unit which performs low noise amplification and down conversion of a receiving signal.

In addition, the wireless communication unit 140 includes a mobile communication module (for example, 3-Generation mobile communication module, a 3.5-Generation mobile communication module, or a 4-Generation mobile communication module), a digital broadcasting module (for example, DMB module), a short range communication module (for example, Wi-Fi, a Bluetooth module, and a Near Field Communication (NFC) module).

The audio processing unit 150 performs an input and an output function of an audio signal for voice recognition, voice recording, digital recording, and a calling function via a speaker and a microphone. The audio processing unit 150 receives the audio signal from the controller 170 and outputs the received audio signal to the SPK after performing a Digital to Analog (D/A) conversion and an amplification.

The audio processing unit 150 provides the received audio signal from the microphone to the controller 170 after performing an A/D conversion. The speaker outputs the audio signal received from the audio processing unit 150 after converting into a sound wave. The microphone converts the sound wave delivered from a person or other sound source into the audio signal.

The sensor unit 160 detects a physical quantity (for example, speed, acceleration, altitude, gravity, etc.) or a corresponding change, and delivers a detected signal to the controller 170. The controller 170 determines one of a landscape mode and a portrait mode as a display mode of the mobile terminal 100 based on the detected signal. When a screen automatic conversion function of the mobile terminal 100 is activated, the controller recognizes a posture of the mobile terminal 100 by using the detected signal.

For example, the detected signal may include the information related to a direction of gravity, and the controller 170 may calculate the direction of the gravity by using the detected signal. When the direction of the gravity is X axis direction (as described below with respect to FIG. 3A), the controller 170 determines the display modes as a portrait mode.

When the direction of the gravity is Y axis direction (as described below with respect to FIG. 4), the controller 170 determines the display mode as a landscape mode. Of course, the display mode may be determined as either one of the two regardless of the detected signal. When the screen automatic conversion function is inactivated, the controller 170 determines a display mode as a mode preset as a default, for example, the portrait mode, regardless of the posture of the mobile terminal 100. In addition, when a video replay is performed, the controller 170 determines the display mode as the landscape mode.

The controller 170 controls an overall operation of the mobile terminal 100 and the signal flow between the internal components of the mobile terminal 100, performs the data processing function, and controls a power supply from a battery to the internal components. The controller 170 temporarily stores the main memory device which stores a booting program, an operating system, and an application, and temporarily stores the data to be written to the storing unit 130, and may include a cash memory which temporarily stores the data read by the storing unit 130, a Central Processing Unit (CPU), and a Graphics Processing Unit (GPU).

The operating system acts as an interface between the hardware and the application, as well as between multiple applications, and manages the computer sources such as the CPU, the GPU, the main memory device, and the secondary memory unit. In addition, the operating system controls the operation of the hardware and an execution of the application, determines the order of the tasks, controls a calculation of the CPU and the GPU, and stores data and files in the storage unit.

The CPU is a central control unit of a computer system, and performs computation and comparison of a data, an interpretation and execution of commands. The GPU is a graphics control unit performing a computation and a comparison of the data related to graphics, and interpretation and execution of commands on behalf of the CPU. Each CPU and the GPU may be combined as one package in which two or more independent cores (for example, a quad-core) are formed as a single integrated circuit. In addition, the CPU and the GPU may be integrated into a single chip System on Chip (SoC). Also, the CPU and the GPU may be packaged as a multi-layer. A configuration including the CPU and the GPU may be referred to as an Application Processor (AP).

The technical features related to the present disclosure of the controller 170 (i.e., a touch input method) is described below with respect to the accompanying drawings.

Not all such components may be listed here because the components may be modified in various manners according to a convergence trend of a digital device. However, the mobile terminal may further include elements which are not mentioned above, such as a GPS module, a Near Filed Communication (NFC) module, a vibration module, a camera, an accessory, and an external interface unit.

The accessory may be an accessory of the mobile terminal 100 which is detachable from the mobile terminal, for example, a pen to touch to the touch panels 111 and 112. In addition, in the mobile terminal 100, specific elements may be excluded from the above-mentioned configuration or may be substituted by other elements according to a function, design, or purpose of the mobile terminal 100.

Figure 2:
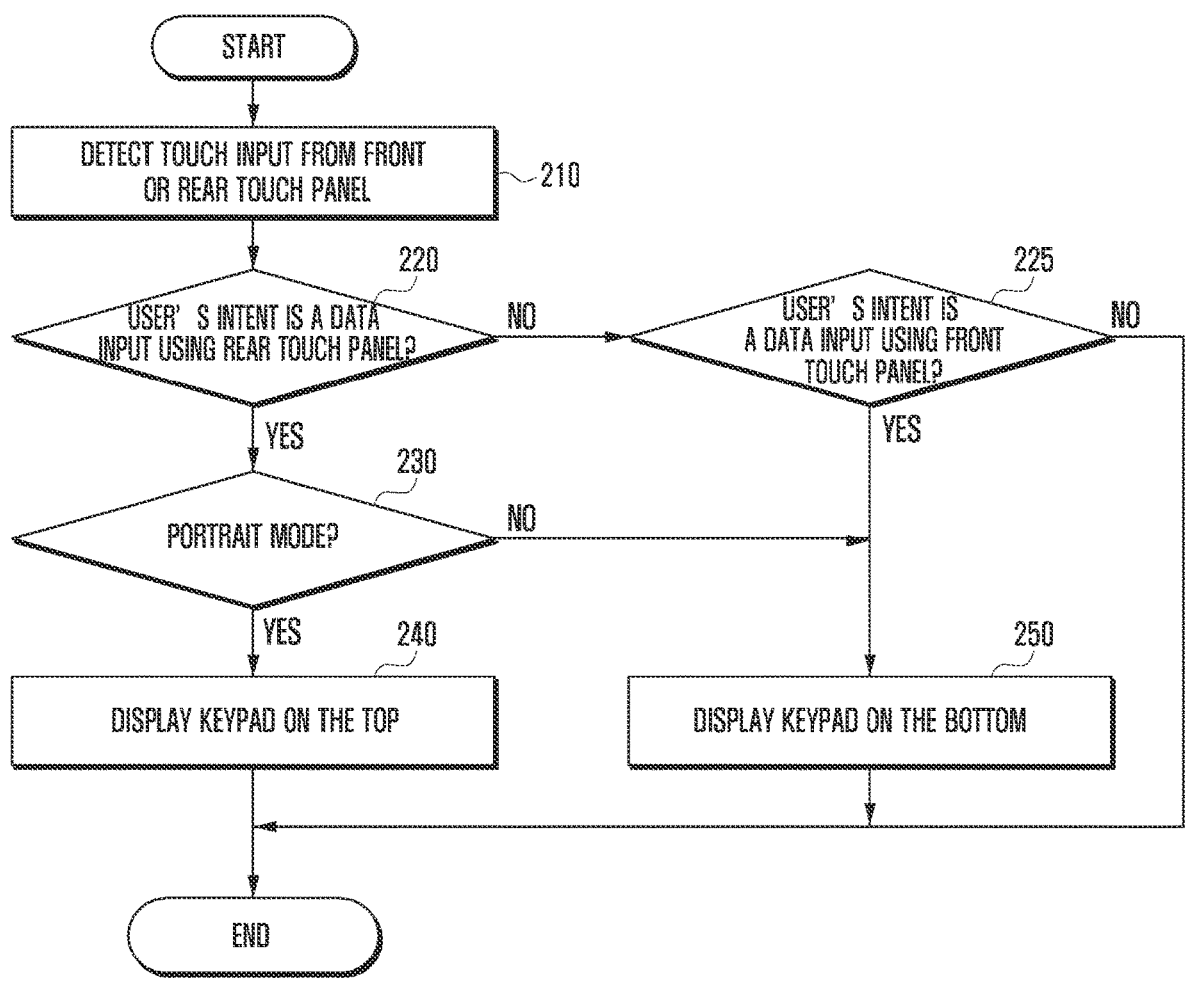
FIG. 2 is a flow chart explaining a touch input method according to an embodiment of the present disclosure.

FIG. 2 is a flow chart explaining a touch input method according to an embodiment of the present disclosure. FIGS. 3A, 3B, 4, 5A, and 5B are screens explaining a touch input method according to an embodiment of the present disclosure.

Referring to FIGS. 2,3A, 3B, 4, 5A, and 5B, the mobile terminal 100 is assumed to be a mobile terminal (for example, a smart phone in which a screen size is 5 inches or less) which is easy to hold in one hand.

Figure 3B:
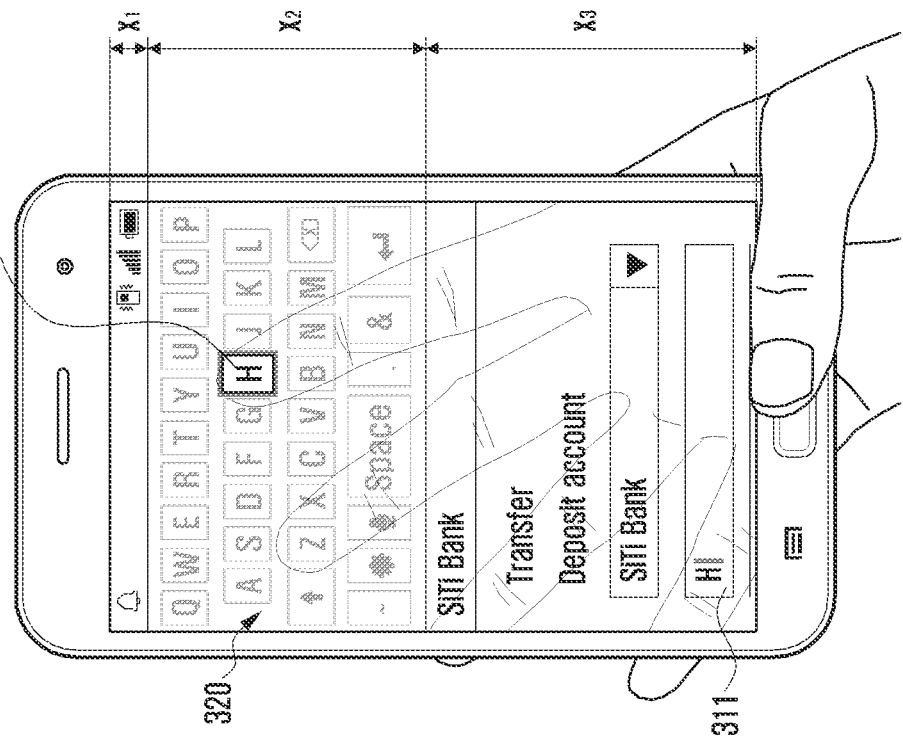
FIGS. 3A, 3B, 4, 5A, and 5B are screens explaining a touch input method according to an embodiment of the present disclosure.
Figure 3A:
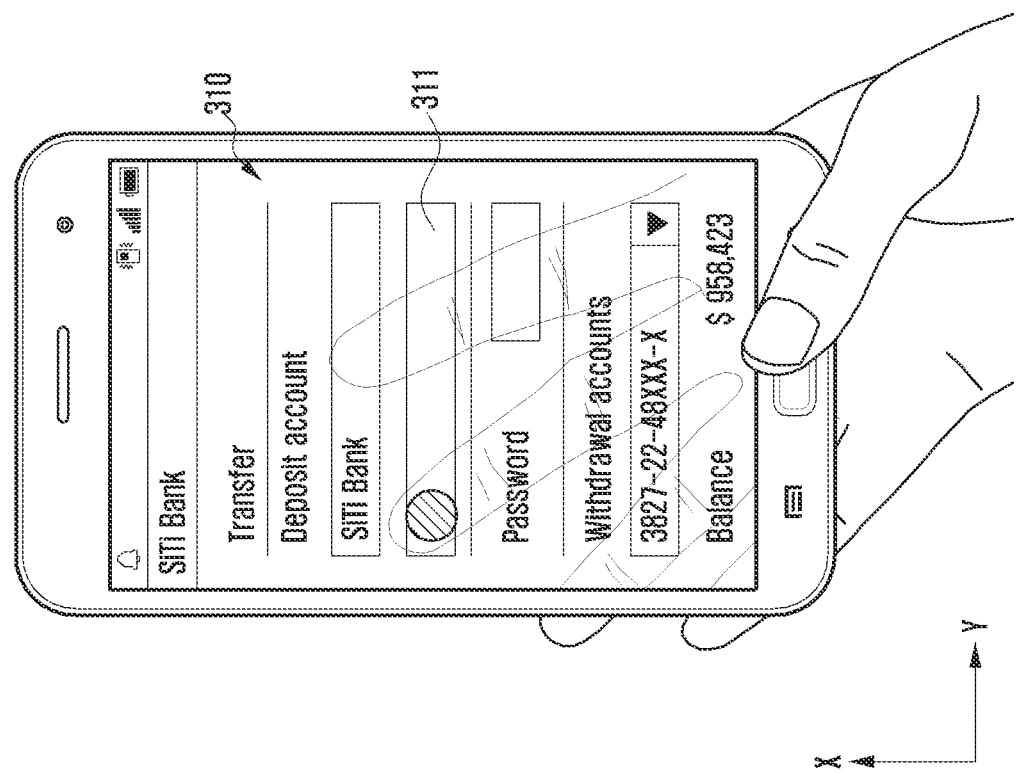

The touch screen 110 displays an image 310 as illustrated in FIG. 3A under the control of the controller 170. The image 310 includes a data input box 311. The controller 170 detects the touch input from the front touch panel 11 or the rear touch panel 112 at operation 210. The controller 170 determines whether the user's intent is a data input by using the rear touch panel 112 in response to the touch input at operation 220.

For example, while holding the mobile terminal 100 with one hand (for example, the right hand), the user touches the rear touch panel 112 with a finger (for example, an index finger) of the same hand (i.e., the right hand). If the touch input is a "tap" generated from the data input box 311, and is detected through the rear touch panel 112, the controller 170 determines that the user's intent is "the data input by using the rear touch panel 112 with one hand".

When the user's intent is determined as the data input by using the rear touch panel 112 with one hand, the controller 170 verifies whether the display mode of the mobile terminal is a portrait mode at operation 230. As a verification result of operation 230, if the display mode of the mobile terminal 100 is the portrait mode, the controller 170 controls the touch screen 110 to display the keypad 320 on the top of the touch screen 110 as illustrated in FIG. 3B at operation 240.

When the keypad 320 is displayed on the touch screen 110, a display area of the touch screen 110 is divided into a keypad area, a top area positioning above thereof, and a bottom area positioning under thereof. Referring to FIG. 3B, a vertical length of the top area is x1, a vertical length of the keypad area is x2, and a vertical length of the bottom is x3. The "displays the key pad 320 on the top" described above refers to displaying the keypad 320 on the touch screen to be "0≤x1<x3".

The "displays the keypad 320 on the bottom" refers to display the keypad 320 on the touch screen 110 to be "0≤x3<x1".

Referring to FIG. 3B, the user holds the mobile terminal 100 with right hand and touches the "H" key on the keypad 320 with a right hand index finger through the rear of the touch screen 110. In response to the user's touch, the rear touch panel 112 generates a touch event (includes a touch coordinate within the area of "H" key) related to the "H", and delivers to the controller 170.

In response to the touch event, the controller 170 verifies the key value preset in the touch coordinate in the key value table, and controls the transparent display panel 113 to display the verified key value, (i.e., "H" 330) on the touch area. As the user's touch is released, the controller 170 determines that the touch has released if the touch coordinate is not received from the rear touch panel 112. When the touch is released, the controller 170 controls the transparent display panel 113 to display "H" on the data input box 311.

As a verification result of operation 230, if the display mode of the mobile terminal 100 is a landscape mode, the controller 170 controls the touch screen 110 to display the keypad in the bottom of the touch screen 110 at operation 250.

Figure 4:
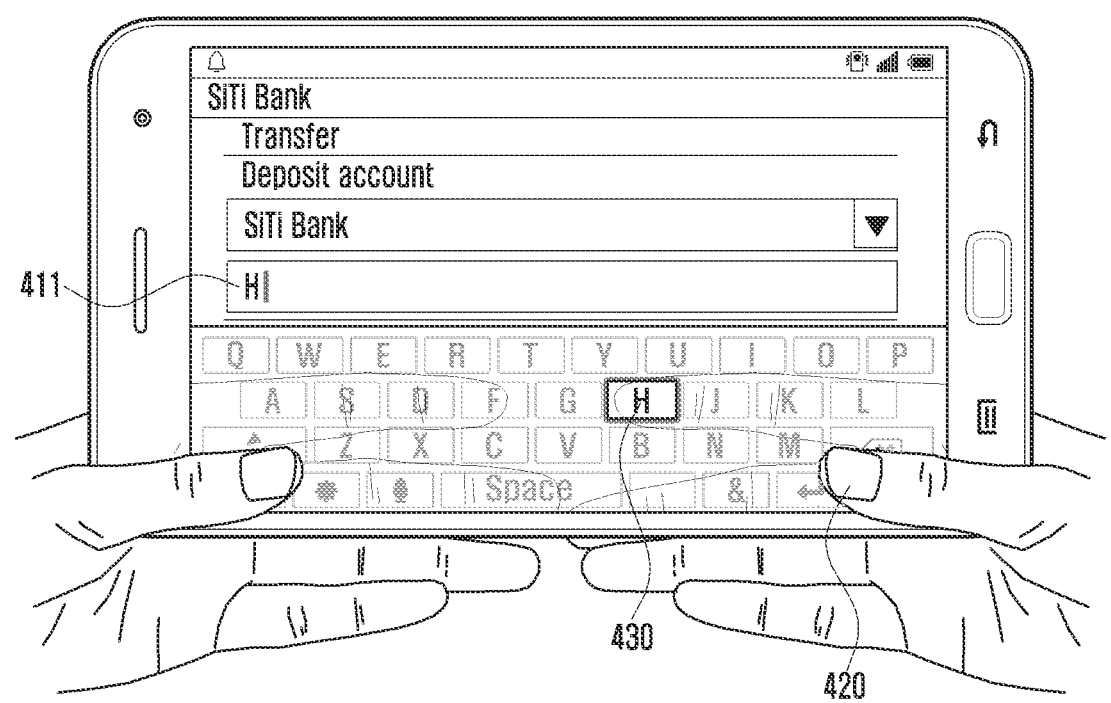

Referring to FIG. 4, the user holds the left side of the mobile terminal 100 with the left hand and holds the right side of the mobile terminal with right hand, and touches the "H" key on the keypad 420 with the index finger through the rear of the touch screen 110.

In response to the user's touch, the rear touch panel 112 generates the touch event related to "H", and transmits the touch event to the controller 170. In response to the touch event, the controller 170 verifies the key value set in the touch coordinate in the key value table, and controls the transparent display panel 113 to display the verified key, (i.e., "H" 430) on the touch area. In response to the touch release, the controller 170 controls the transparent display panel 113 to display "H" on the data input box 411.

When the user's intent is determined as the data input using the rear touch panel 112, the controller 170 may not respond to the touch input corresponding to the front touch panel 111. The controller 170 performs the function (for example, displays a character on the data input box) in response only to the touch input corresponding to the rear touch panel 112. As a result, an error of the data input through the front touch panel 111 is prevented.

For example, the user taps the front touch panel 111 with a thumb. In response to the tap, the controller 170 performs the operation displaying the character on the data input box. Such operation is not intended by the user. Therefore, when the controller 170 does not respond to the touch input corresponding to the front touch panel 111, an error being performed by the user's unintended operation is prevented. Furthermore, the controller 170 may turn the power off in the front touch panel in order to prevent errors and reduce power consumption. For example, the controller 170 may stop the power supply from the battery to the front touch panel 111.

As a determination result of operation 220, when the user's intent is not a data input using the rear touch panel 112, the controller 170 determines whether the user's intent is a data input using the front touch panel 111 at operation 225. For example, referring to FIGS. 5A and 5B, when the touch input is a "tap" generated from the data input box 511 and is detected through the front touch panel 111, the controller 170 determines that user's intent is the data input using the front touch panel 111. When the user's intent is determined as a data input using the front touch panel 111, the controller 170 proceeds to the previously described operation 250 regardless of the display mode, and controls the touch screen 110 to display the keypad 520 on the bottom of the touch screen 110.

Figure 5A:
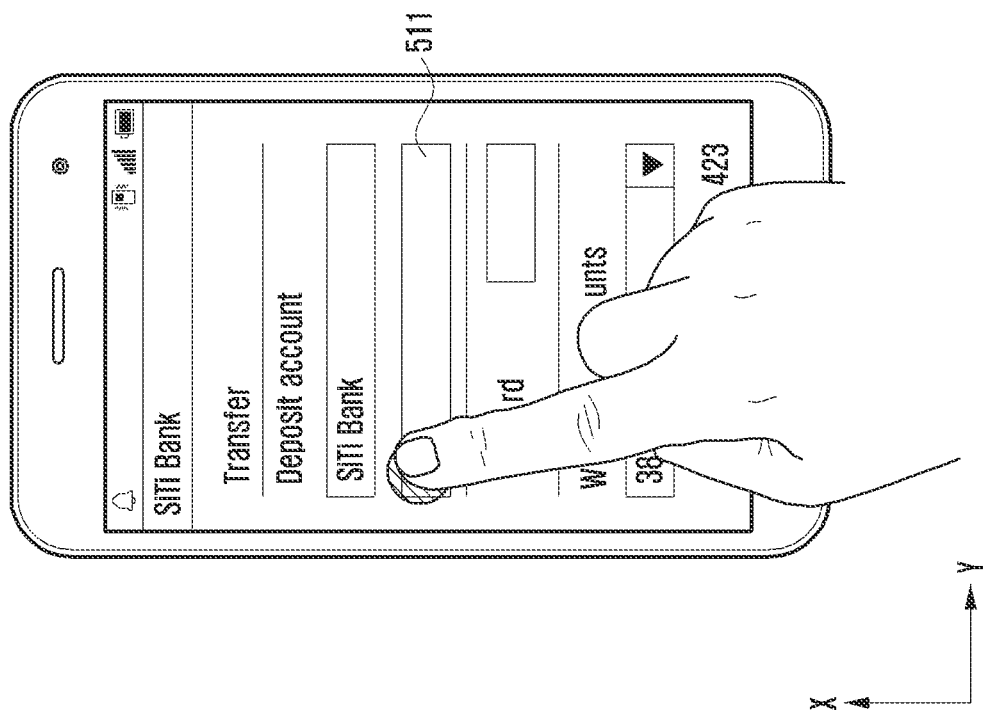
Figure 5B:
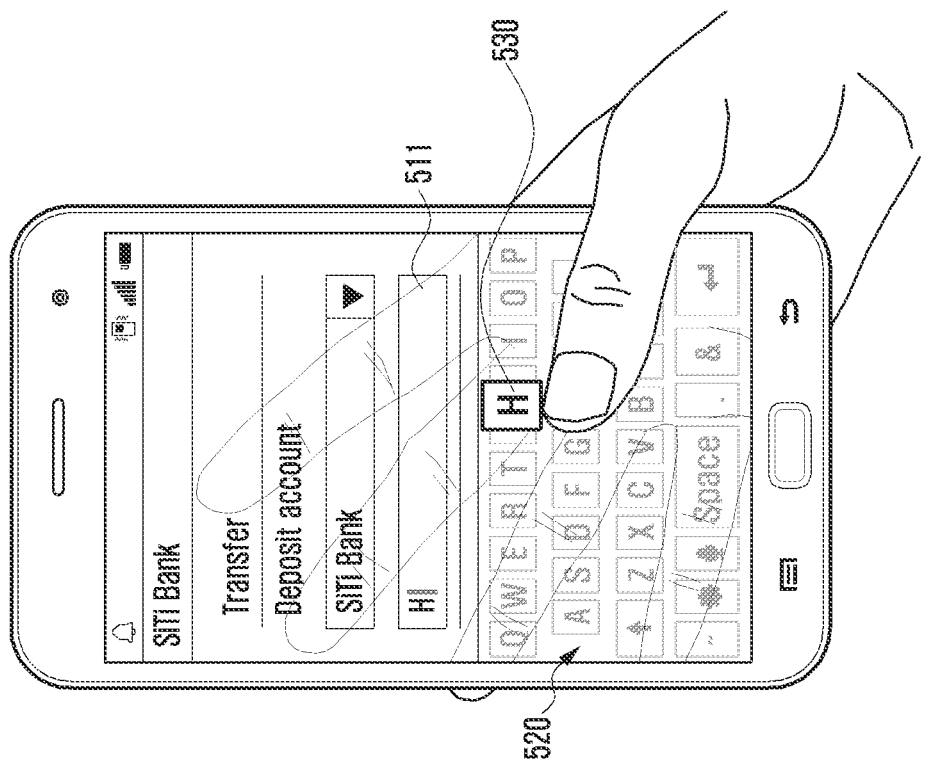

Referring to FIG. 5B, the user grabs the mobile terminal 100 with the right hand and touches "H" key on the keypad 520 with the right hand thumb through the front of the touch screen 110. In response to the user's touch, the front touch panel 111 generates the touch event related to "H" and delivers to the controller 170. In response to the touch event, the controller 170 verifies the key value set on the touch coordinate in the key value table, and controls the transparent display panel 111 to display the verified key value, (i.e., "H" 530) around the touch area. On response to the touch release, the controller 170 controls the transparent display panel 113 to display "H" on the data input box 511. When the user's intent is determined as the data input using the front touch panel 111, the controller 170 may not respond to the touch input corresponding to the rear touch panel 112. Furthermore, the controller 170 may stop the power supply from the battery to the rear touch panel 112. As a determination result of operation 225, when the user's intent is not the data input using the front touch panel 111 (for example, the user touches somewhere other than the data input box), the process is terminated without any display of the keypad.

In the above description, operation 230 of verifying a portrait mode may be omitted. For example, if the mobile terminal 100 is inconvenient to hold in one hand (for example, if the mobile terminal 100 is a tablet PC having a screen size of 10 inches or more), the display position of the keypad may be determined regardless of the display mode. When the user's intent is data input using the rear touch panel 112, the keypad is displayed on the top, and in the opposite circumstance, the keypad is displayed on the bottom. Of course, operation 230 may be omitted regardless of the screen size.

Figure 6:
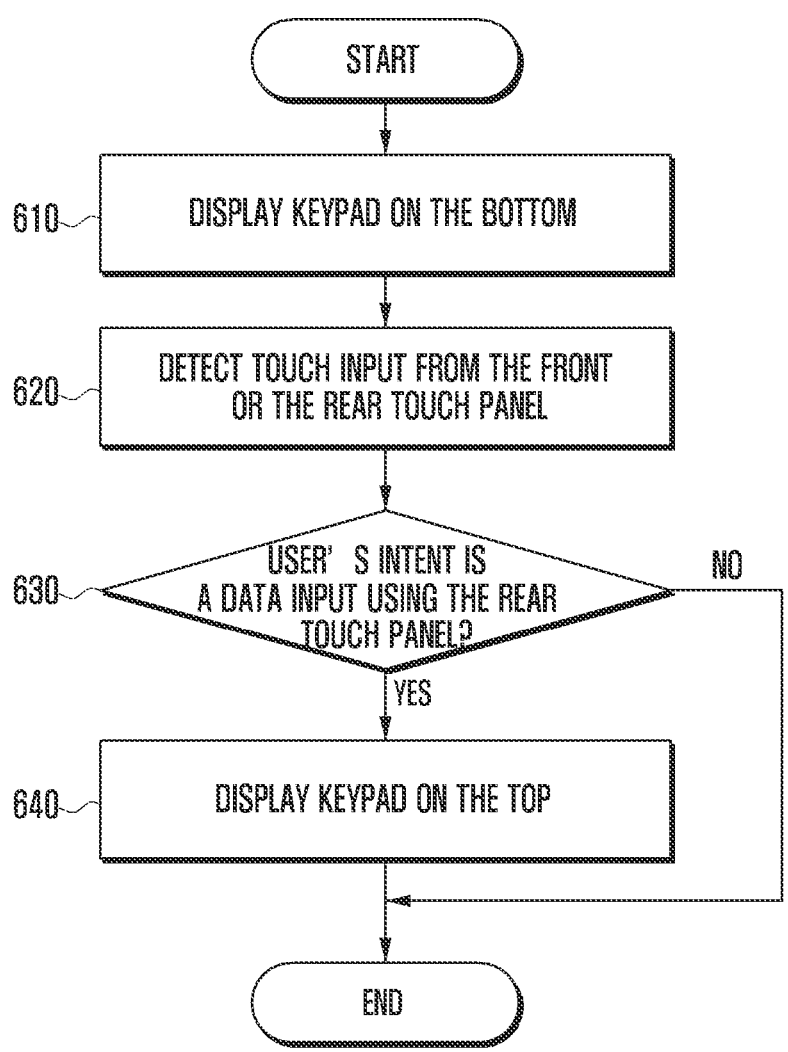
FIG. 6 is a flow chart explaining a touch input method according to another embodiment of the present disclosure.

FIG. 6 is a flow chart explaining a touch input method according to an embodiment of the present disclosure.

Referring to FIG. 6, it is assumed that the front touch panel 111 and the rear touch panel 112 are always in the power on state as long as the transparent touch panel is turned on.

The touch screen 110 (i.e., the transparent display panel 113) displays the keypad on the bottom under the control of the controller 170 at operation 610. The controller 170 detects the touch input from the front touch panel 111 or the rear touch panel 112 at operation 620. The controller 170 determines whether the user's intent is the data input using the rear touch panel 112 in response to the touch input at operation 630.

For example, when the touch input is detected through the front touch panel 111 or the rear touch panel 112, and is a touch movement (for example, a drag or a flick) from the bottom to the top, the controller 170 determines that the user's intent is the data input using the rear touch panel 112. When the user's intent is determined as the data input using the rear touch panel 112, the controller 170 controls the transparent display panel 113 to display the keypad on the top at operation 640. When the user's intent is determined as the data input using the rear touch panel 112, the controller 170 may not respond to other touch inputs except for the touch movement from the top to the bottom among the touch inputs. When "the touch movement from the top to the bottom" is detected from the front touch panel 111 or the rear touch panel while the keypad is displayed on the top, the controller 170 controls the transparent display panel 113 to display again the keypad on the bottom. When the keypad is displayed again on the bottom, the controller 170 may not respond to other touch inputs except for the touch movement from the bottom to the top among the touch inputs corresponding to the rear touch panel 112.

Figure 7:
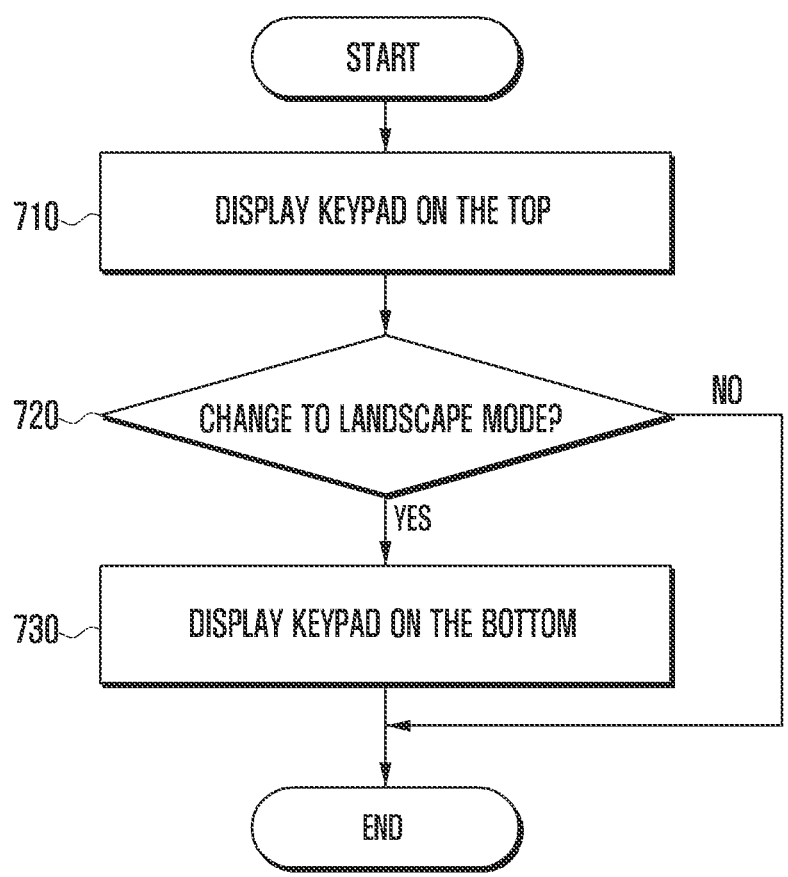
FIG. 7 is a flow chart explaining a touch input method according to another embodiment of the present.

FIG. 7 is a flow chart explaining a touch input method according to another embodiment of the present disclosure.

Referring to FIG. 7, a current display mode is assumed to be a portrait mode. The touch screen 110 (i.e., the transparent display panel 113) displays the keypad on the top under the control of the controller 170 at operation 710. In this case, operating the keypad through the rear touch panel 112 may be easier than operating through the front touch panel 111. The user touches the touch panel 112 with a middle finger or an index finger of the hand holding the mobile terminal 100. The controller 170 determines whether the display mode has changed from the portrait mode to the landscape mode at operation 720. When the display mode has changed from the portrait mode to the landscape mode, the controller 170 controls the transparent display panel 113 to display the keypad on the bottom at operation 730. In this case, operating the keypad through the front touch panel 111 may be easier than operating through the rear touch panel 112. The user touches the front touch panel 111 with a thumb of the hand holding the mobile terminal 100.

According to the present disclosure, a touch input method and the mobile terminal provides to perform the touch input in a stable manner through the front and the rear of the touch screen with the hand holding the mobile terminal.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch input method in a mobile terminal having a touch screen that includes a transparent display panel, a front touch panel configured to detect a touch input corresponding to a front of the transparent display panel, and a rear touch panel configured to detect a touch input corresponding to a rear of the transparent display panel, the method comprising:
    displaying a keypad at a bottom of the touch screen;
    detecting a touch gesture from one of the front touch panel or the rear touch panel; and
    displaying the keypad at a top of the touch screen and restricting a touch input via the front touch panel in response to the detected touch gesture moving from the bottom of the touch screen to the top of the touch screen via the rear touch panel.

2. The method of claim 1, wherein the detecting of the touch gesture from one of the front touch panel or the rear touch panel further comprises:
    determining that the detected touch gesture is to initiate data input via the rear touch panel when the touch gesture is generated from a data input box of an image and is detected through the rear touch panel; and
    determining that the detected touch gesture is to initiate data input via the front touch panel when the touch gesture is generated from the data input box of the image and is detected through the front touch panel.

3. The method of claim 2, further comprising:
    maintaining the displayed keypad at the bottom of the touch screen when the detected touch gesture is to initiate data input via the front touch panel.

4. The method of claim 3, further comprising:
    detecting a first touch movement from the bottom of the touch screen to the top of the touch screen from one of the front touch panel or the rear touch panel while displaying the keypad at the bottom of the touch screen; and
    displaying the keypad at the top of the touch screen in response to the first touch movement.

5. The method of claim 2, further comprising;
    turning a power of the front touch panel off or not responding to a touch input corresponding to the front touch panel when the detected touch gesture is to initiate data input via the rear touch panel; and
    turning a power of the rear touch panel off or not responding to a touch input corresponding to the rear touch panel when the detected touch gesture is to initiate data input via the front touch panel.

6. The method of claim 2, wherein the detected touch gesture is to initiate data input via the rear touch panel is indicated by a predetermined touch movement.

7. The method of claim 2, further comprising:
    partially disabling the rear touch screen when the detected touch gesture is determined to initiate data input via the front touch panel.

8. The method of claim 1, further comprising:
    detecting a second touch movement from the top of the touch screen to the bottom of the touch screen from one of the front touch panel or the rear touch panel while displaying the keypad at the top of the touch screen; and
    displaying the keypad at the bottom of the touch screen in response to the second touch movement.

9. The method of claim 1, wherein the detecting of the touch gesture from one of the front touch panel or the rear touch panel further comprises:
    determining that the detected touch gesture is to initiate data input via the rear touch panel with a finger of one hand holding the mobile terminal when the touch gesture is generated from a data input box of an image and is detected through the rear touch panel.

10. The method of claim 1, wherein the keypad is displayed at the top of the touch screen when a display mode of the mobile terminal is a portrait mode.

11. The method of claim 1, further comprising:
    determining a display mode as one of a landscape mode or a portrait mode,
    wherein the keypad is displayed at the top of the touch screen if the display mode is determined as the portrait mode and the touch gesture is detected via the rear touch panel.

12. The method of claim 11, further comprising:
    displaying the keypad at the bottom of the touch screen if the display mode has changed from the portrait mode to a landscape mode.

13. A mobile terminal, the mobile terminal comprising:
    a touch screen including:
        a transparent display panel,
        a front touch panel configured to detect a touch input corresponding to a front of the transparent display panel, and
        a rear touch panel configured to detect a touch input corresponding to a rear of the transparent display panel; and
    at least one processor configured to control the touch screen,
    wherein the at least one processor is further configured to:
        control the touch screen to display a keypad at a bottom of the touch screen,
        control the touch screen to detect a touch gesture from one of the front touch panel or the rear touch panel, and
        control the touch screen to display the keypad at a top of the touch screen and restrict a touch input via the front touch panel in response to the detected touch gesture moving from the bottom of the touch screen to the top of the touch screen via the rear touch panel, and wherein the restricting of the touch input via the front touch panel comprises turning a power of the front touch panel off.

14. The mobile terminal of claim 13, wherein the at least one processor is further configured to:

determine that the detected touch gesture is to initiate data input via the rear touch panel when the touch gesture is generated from a data input box of an image and is detected through the rear touch panel, and determine that the detected touch gesture is to initiate data input via the front touch panel when the touch gesture is generated from the data input box of the image and is detected through the front touch panel.

15. The mobile terminal of claim 14, wherein the at least one processor is further configured to control the touch screen to maintain the keypad at the bottom of the touch screen when the detected touch gesture is to initiate data input via the front touch panel.

16. The mobile terminal of claim 15, wherein the at least one processor is further configured to:

control the touch screen to detect a first touch movement from the bottom of the touch screen to the top of the touch screen from one of the front touch panel or the rear touch panel while displaying the keypad at the bottom of the touch screen, and display the keypad at the top of the touch screen in response to the touch movement.

17. The mobile terminal of claim 14, wherein the detected touch gesture is to initiate data input via the rear touch panel is indicated by a predetermined touch movement.

18. The mobile terminal of claim 14, wherein the at least one processor is further configured to control the touch screen to partially disable the front touch screen when the detected touch gesture is determined to initiate data input via the rear touch panel.

19. The mobile terminal of claim 13, wherein the at least one processor is further configured to:

control the touch screen to detect a second touch movement from the top of the touch screen to the bottom of the touch screen from one of the front touch panel or the rear touch panel while displaying the keypad at the top of the touch screen, and display the keypad at the bottom of the touch screen in response to the second touch movement.

20. The mobile terminal of claim 13, wherein the at least one processor is further configured to:

determine a display mode as one of a landscape mode and a portrait mode, and control the transparent display panel to display the keypad at the top of the touch screen when the display mode is determined as the portrait mode.

21. The mobile terminal of claim 13, wherein the at least one processor is further configured to control the touch screen to determine a display mode as one of a landscape mode and a portrait mode, and wherein the keypad is displayed at the top of the touch screen if the display mode is determined as the portrait mode and the touch gesture is detected via the rear touch panel.

22. The mobile terminal of claim 21, wherein the at least one processor is further configured to control the touch screen to display the keypad at the bottom of the touch screen if the display mode has changed from the portrait mode to a landscape mode.

* * * * *